(12) United States Patent
Price

(10) Patent No.: US 11,146,652 B2
(45) Date of Patent: Oct. 12, 2021

(54) METHODS AND SYSTEMS FOR ENRICHING DATA

(71) Applicant: ZeroFOX, Inc., Baltimore, MD (US)

(72) Inventor: Matthew Alan Price, Baltimore, MD (US)

(73) Assignee: ZeroFOX, Inc., Baltimore, MD (US)

( * ) Notice: Subject to any disclaimer, the term of this patent is extended or adjusted under 35 U.S.C. 154(b) by 7 days.

(21) Appl. No.: 16/670,081

(22) Filed: Oct. 31, 2019

(65) Prior Publication Data

US 2021/0136169 A1    May 6, 2021

(51) Int. Cl.
*H04L 29/08* (2006.01)
*G06N 20/00* (2019.01)

(52) U.S. Cl.
CPC ......... *H04L 67/2819* (2013.01); *G06N 20/00* (2019.01); *H04L 67/142* (2013.01); *H04L 67/2804* (2013.01)

(58) Field of Classification Search
None
See application file for complete search history.

(56) References Cited

U.S. PATENT DOCUMENTS

| | | | | |
|---|---|---|---|---|
| 2014/0297652 A1* | 10/2014 | Stevens | ............. | G06F 16/24568 707/741 |
| 2015/0039757 A1* | 2/2015 | Petersen | ................. | H04L 41/16 709/224 |
| 2016/0170814 A1* | 6/2016 | Li | ......................... | G06Q 10/10 719/318 |
| 2017/0255536 A1* | 9/2017 | Weissinger | ........ | G06Q 30/0201 |

\* cited by examiner

*Primary Examiner* — Natisha D Cox
(74) *Attorney, Agent, or Firm* — DLA Piper LLP (US)

(57) ABSTRACT

A computer-implemented method for enriching data may include: receiving, via a server, a data packet from a source of a plurality of sources; determining, via the server, at least one machine learning model of a plurality of machine learning models that applies to the data packet based on at least one of the source or attributes of the data packet; in response to determining the at least one machine learning model, sending, via the server, the data packet to the at least one machine learning model; analyzing the data packet with the at least one machine learning model; receiving, via the server, the result from the at least one machine learning model; adding, via the server, the result to the data packet to create an enriched data packet; and sending, via the server, the enriched data packet to a notification service.

20 Claims, 8 Drawing Sheets

METHODS AND SYSTEMS FOR ENRICHING DATA

BACKGROUND

In the information age of social media, many companies and organizations are concerned with their online presence, both in terms of how it affects their image and how it affects their and their customers' safety. For companies or brands, this may entail monitoring social networks for mentions of their products, stores, or brands. It may also entail monitoring their employees' email accounts or individual social network profiles for security reasons and risk prevention. Companies that deal with sensitive information of customers may also be concerned with possible attempts by fraudsters to pose with a fake domain. Schools or libraries may be concerned with monitoring social networks to preemptively detect possible threats of violence.

Regardless of the motives behind monitoring the internet and social media, there are millions of events (i.e. some piece of content accessible on the internet) that need to be sorted and filtered. Based on the sorting and filtering, certain rules may be applied to each event to determine if it is worthy of someone's attention. However, there is a balance to be struck between effective monitoring and over-alerting. With millions of events being detected every day, too low of a bar to warrant an alert may cause the number of alerts to be cumbersome and overwhelming to deal with. On the other hand, too high of a bar to warrant an alert may prevent threats or events in serious need of attention from being detected.

SUMMARY OF THE INVENTION

Embodiments of the present disclosure relate to methods for enriching data. According to one aspect of the disclosure, the method may include receiving, via a server, a data packet from a source of a plurality of sources; determining, via the server, at least one machine learning model of a plurality of machine learning models that applies to the data packet, wherein the at least one machine learning model is determined based on at least one of the source or attributes of the data packet; in response to determining the at least one machine learning model, sending, via the server, the data packet to the at least one machine learning model; analyzing the data packet with the at least one machine learning model to obtain a result; receiving, via the server, the result from the at least one machine learning model; adding, via the server, the result to the data packet to create an enriched data packet; and sending, via the server, the enriched data packet to a notification service.

In some embodiments, the result may include at least one of a binary prediction, a number representing a confidence level of a prediction, or text. In some embodiments, the method may include parsing the data packet to extract fields required for the determined machine learning model. In some embodiments, sending the data packet may include employing an HTTP or an HTTPS protocol to transmit the data packet to the machine learning model. In some embodiments, determining the at least one machine learning model may be based on at least one attribute of the data packet, wherein attributes may include text inclusion, image inclusion, URL inclusion, type of language, and type of message.

In some embodiments, the enriched data packet is a JSON object that may include the data packet and the result. In some embodiments, the method may include sending the enriched data packet to a rule engine, the rule engine being configured to identify a threat within the enriched data packet; and, in response to identifying a threat, generating an alert for the data packet.

According to another aspect of the present disclosure, a method for enriching data may include receiving, via a server, a data packet from a source of a plurality of sources; determining, via the server, a first set of at least one machine learning model that applies to the data packet; in response to determining the first set, sending, via the server, the data packet to the first set; analyzing the data packet with the first set to obtain a first collection of results; receiving, via the server, the first collection of results from the first set; adding, via the server, at least a portion of the first collection of results to the data packet to create a first enriched data packet; determining, via the server, a second set of at least one machine learning model that applies to the first enriched data packet; in response to determining the second set, sending, via the server, the enriched data packet to the second set; analyzing the first enriched data packet with the second set to obtain a second collection of results; receiving, by the server, the second collection of results from the second set; and adding, via the server, at least a portion of the second collection of results to the first enriched data packet to create a second enriched data packet.

In some embodiments, a result may include at least one of a binary prediction, a number representing a confidence level of a prediction, or text. In some embodiments, the method may include parsing the data packet to extract fields required for the determined sets. In some embodiments, determining the first set is based on at least one attribute of the data packet, wherein attributes may include text inclusion, image inclusion, URL inclusion, type of language, and type of message. In some embodiments, determining the second set is based on at least a portion of the first collection of results. In some embodiments, an enriched data packet is a JSON object that may include a data packet and a corresponding result. In some embodiments, the method may include sending the second enriched data packet to a notification service. In some embodiments, the data packet may be received from a queuing service. In some embodiments, sending the data packet may include employing an HTTP or an HTTPS protocol to transmit the data packet to the first set. In some embodiments, sending the first enriched data packet may include employing an HTTP or an HTTPS protocol to transmit the first enriched data packet to the second set.

According to another aspect of the present disclosure, a system for enriching data may include a network connected to at least one data source; a data ingestion service configured to ingest data packets via the network from the at least one data source; an enrichment service; and at least one machine learning model. The enrichment service may be configured to, by at least one processor, receive ingested data packets from the data ingestion service; determine at least one machine learning model of a plurality of machine learning models that applies to the data packet; send the data packet, in the form of a JSON, to the at least one machine learning model; receive a result, in the form of a JSON, from the at least one machine learning model, wherein the result comprises at least one of a binary prediction result, a number representing a confidence level of a prediction, or text; add the result to the data packet to create an enriched data packet; and compile the enriched data packet as a JSON object. The at least one machine learning model may be configured to, by at least one processor, receive the data packet; analyze the data packet to obtain the result; and send the result to the enrichment service.

In some embodiments, the enrichment service may be configured to employ an HTTP or an HTTPS protocol to transmit the data packet to the at least one machine learning model. In some embodiments, the system may include a notification service configured to receive the enriched data packet from the enrichment service; and distribute a notification containing the data packet based on a set of rules.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION OF SEVERAL EMBODIMENTS

Figure 1:
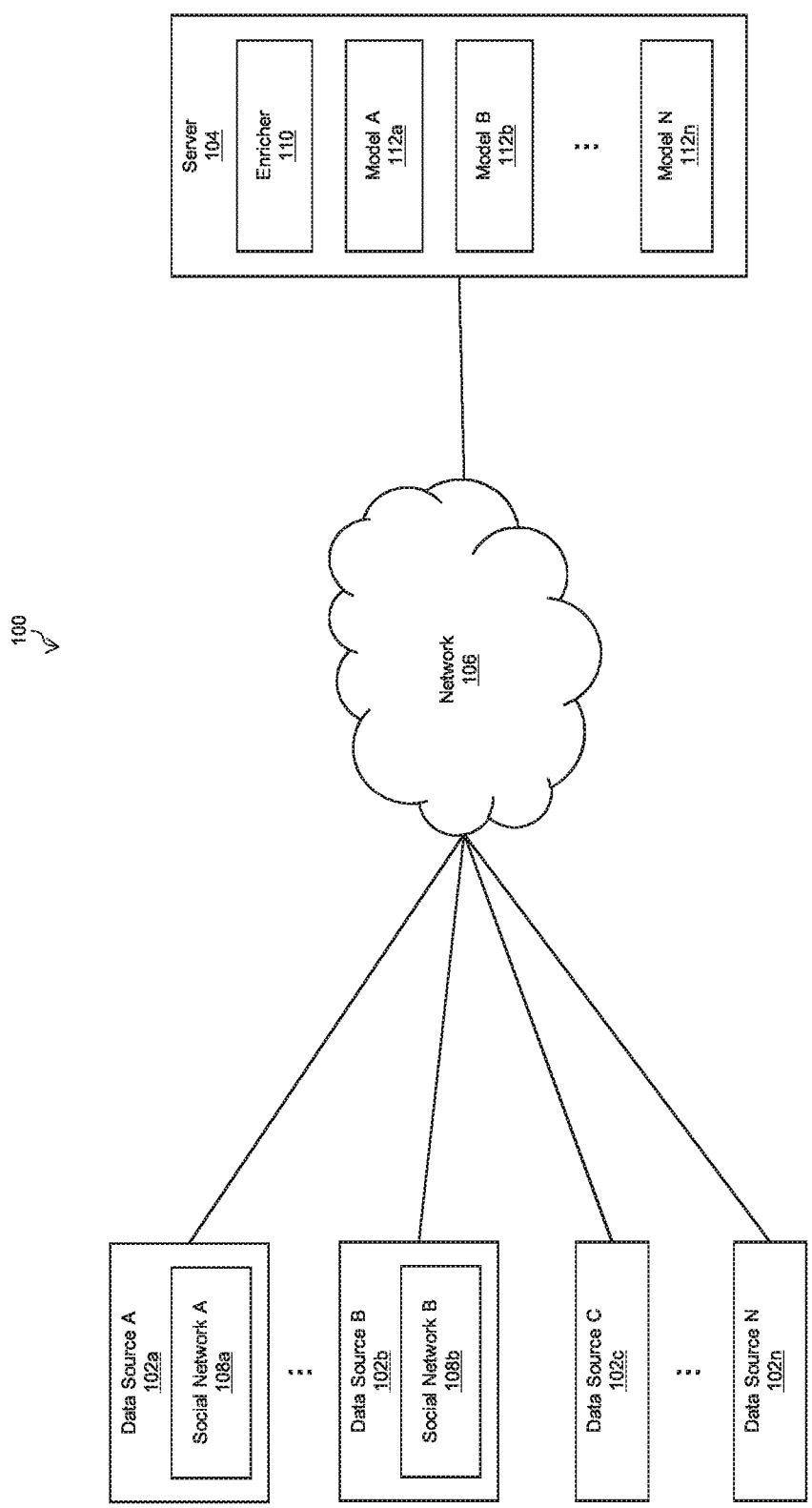
FIG. 1 is a block diagram of an example system for enriching data, according to some embodiments of the present disclosure.

The following detailed description is merely exemplary in nature and is not intended to limit the invention or the applications of its use.

Embodiments of the present disclosure are related to an improved architecture and method for enriching data, providing context to data, and ultimately improving the process of distributing alerts for detected online events. The architecture of the present disclosure may include a network ingestion service and/or a queuing service to monitor a variety of sources, such as various social media networks (Twitter, Facebook, LinkedIn, etc.), email accounts, and/or domains. Typically, each event (tweet, post, email, domain, etc.) may be forwarded by the queuing service to a rule engine that automatically, based on a pre-defined set of rules or conditions, determines if an event warrants an alert. However, without context provided to the event via an enrichment process, there is a high probability of false positives, e.g. distributing an alert for an event that doesn't actually need an alert. The architecture of the present disclosure utilizes an enrichment service that may intelligently analyze each event with machine learning models to gain predictions, results, or additional information on the event. By adding these results to an event (i.e. providing context), the rule engine may more accurately determine whether or not an event warrants an alert. The service may aggregate the results of each machine learning model and enrich the event with said results. The enrichment service may employ a multi-stage scatter-gather framework. A traditional scatter-gather implementation involves aggregating the results of multiple models into the event before forwarding the event to a rule engine for an alert decision to be made. A multi-stage scatter-gather framework involves multiple iterations of scatter-gather, with different models being employed at each stage potentially leveraging the results of models run in the previous stage(s). This may further improve the context provided to the event, improve the alert determination in the rule engine, and improve the overall efficiency of the enrichment service by reducing unnecessary computation.

The following description may serve as an example of a false positive, i.e. an event that was incorrectly determined to warrant an alert. In general, companies (especially large, financial companies that deal with sensitive information of their customers) have strong issues with people setting up websites with similar domain names to their own website. For example, if Bank of O has a website bankO.com, they may wish to be alerted when similar domain names are detected, e.g. bankO.com. With similar domain names, a Bank of O customer may be tricked into believing they are on their bank's website and enter in their personal information. The domain may also serve to perform phishing, extracting sensitive information automatically from a computer. These types of domains can potentially be very harmful, and so it would be in Bank of O's best interest to be alerted when these domains are detected, so that the domain can be taken down. However, replica domains may not always be utilized for phishing. Sometimes domain names may be "squatting" domains, i.e. a person sets up a domain name similar to a major corporation, parks the domain name unused and empty, and hopes that one day that corporation will purchase the domain from them. These domains are almost exclusively not considered to be dangerous, and it may not be in the interest of the corporation to be notified of this type of similar domain. However, without any sort of enrichment, a rule engine with a rule to detect similar domain names would determine this to be worthy of an alert. To prevent this type of over-alerting, enrichment may provide context to the event and improve the accuracy of the rule engine. For example, an OCR engine may analyze a screenshot of the domain, extract text, and forward the extracted text to a machine learning model trained to detect keywords that may be indicative of phishing or scams, such as a login page or credentials field. An indication of the presence of keywords likely indicative of scams may be added to the event before it is forwarded to the rule engine, allowing the rule engine to make a more informed decision based on the context of the event. If there are no keywords indicative of scams, then no alerts will be distributed, preventing a false positive. On the other hand, if keywords indicative of scams are detected, an alert will be distributed.

FIG. 1 is a block diagram of an example system 100 for enriching data, according to some embodiments of the present disclosure. System 100 may include a server 104 communicably coupled to a plurality of data sources 102a, 102b, . . . , 102n (102 generally) via a network 106. Each data source 102 may include a social network 108, or may not include a social network. Examples of data sources include, but are not limited to, social networks such as Twitter, Facebook, Instagram, LinkedIn, Google+, and YouTube, a plurality of email addresses, and website domains. In some embodiments, data sources 102 may be monitored and every event from each data source may be sent via network 106 to server 104. An event may be any social media post (status update, picture, tweet, Instagram post, YouTube video, LinkedIn post), incoming email, or new domain. Within this disclosure, an event may also be referred to as a data packet. In some embodiments, these may be events from specific social media profiles (i.e. of employees, of profiles within a certain geographic location, etc.). In some embodiments, server 104 may receive each event in the form of a JSON object. In some embodiments, a queuing service may be used to continuously deliver events from data sources 102 to server 104 via network 106. In some embodiments, system 100 may include a network ingestion service to ingest/scrape/extract all events from data sources 102. In some embodiments, events with a mention of specific keywords or buzzwords may be ingested.

Server 104 may include enricher 110 and machine learning models 112*a-n*. Enricher 110 may be configured to receive all events from data sources 102 via network 106. In some embodiments, enricher 110 may be configured to receive events in a JSON format. In some embodiments, enricher 110 may be configured to send events to one or more models 112. Each model 112 may comprise a separate machine learning model that may analyze the event and obtain a prediction result. In some embodiments, enricher 110 may send events to models 112 using an HTTP or an HTTPS protocol. HTTP or HTTPS may provide flexibility to the system by making new services and module deployable and easy to integrate. As long as the service has an HTTP or HTTPS endpoint, it can be deployed and customized without any code changes. In some embodiments, enricher 110 may send events to models 112 in a JSON format. In some embodiments, enricher 110 may be configured to determine which model 112 to send the event to for analysis. In some embodiments, this may be determined based on the source of the event or the content or attributes of the event. In some embodiments, enricher 110 may be configured to parse the event in JSON format to extract fields and field information/values. Enricher 110 may be configured to receive prediction results from models 112 and aggregate the event with some or all results, or provide "context". In some embodiments, an aggregated event or data packet may be referred to as an enriched event or an enriched data packet. In some embodiments, enricher 110 may be configured to send an enriched event in a JSON format to a notification service or rule engine. Further details on models 112 and the determinations on which model to send an event to made by enricher 110 are discussed in relation to FIGS. 4 and 5.

Examples of models 112 may include, but are not limited to, a sentiment analysis model (detects sentiment in text content), a money-flipping analysis model (detects the presence of money flipping scams in text), an optical character recognition (OCR) analysis model (detects and recognizes text in images), a language detection model (determines the language of a text snippet), a natural language processing (NLP) utility model (employs various NPL utilities such as lemmatization, entity recognition, etc.), an analysis message mapper model (maps arbitrary event fields to a structured format), a threat-feed model (determines if any URLs in an event are an indicator of compromise), an object detection model (detects object classes within an image), a form detection model (parser that detects the presence of forms in HTML content), or an email analysis model (parses emails and extracts relevant information into a structured format for downstream usage). This list, however is not exhaustive and many other machine learning models may be utilized in the context of system 100. One benefit of the system is that, when sending events or data packets in the form of a JSON, it is easily configurable and customizable, allowing for new models to be incorporated at any time. Further details on the use of machine learning models such as these within the framework of the present disclosure will be discussed in relation to FIGS. 2-5.

Network 106 may include one or more wide areas networks (WANs), metropolitan area networks (MANs), local area networks (LANs), personal area networks (PANs), or any combination of these networks. Network 106 may include a combination of one or more types of networks, such as Internet, intranet, Ethernet, twisted-pair, coaxial cable, fiber optic, cellular, satellite, IEEE 801.11, terrestrial, and/or other types of wired or wireless networks. Network 106 can also use standard communication technologies and/or protocols.

The various system components—such as modules 110 and 112*a-n*—may be implemented using hardware and/or software configured to perform and execute the processes, steps, or other functionality described in conjunction therewith.

Figure 2:
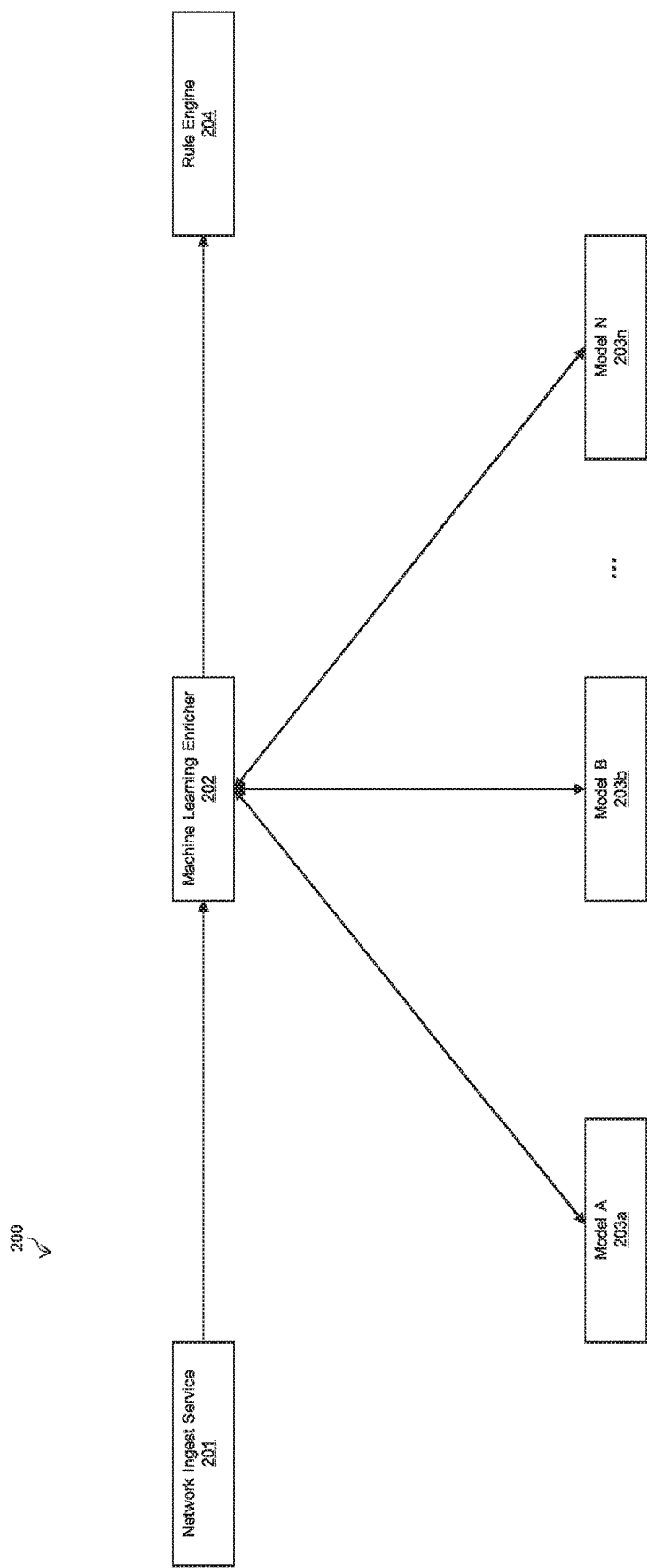
FIG. 2 is a block diagram describing the flow of information within an enrichment system, according to some embodiments of the present disclosure.

FIG. 2 is a block diagram describing the flow of information within an enrichment system 200, according to some embodiments of the present disclosure. In some embodiments, enrichment system 200 may be the same as or similar to system 100 of FIG. 1. System 200 may include a network ingest service 201, a machine learning enricher 202, a rule engine 204, and a plurality of machine learning models 203 *a-n* (203 generally). The network ingest service 201 may be connected to various data pipelines or data sources (not shown) and may monitor and extract events from these data sources. In some embodiments, these data sources may be similar to or the same as the data sources 102 of FIG. 1. In some embodiments, a queuing service may be used in accordance with the network ingest service 201. The ingest service 201 may send all extracted events to machine learning enricher 202. Machine learning enricher 202 may send each event to one or multiple models 203, where the event will be analyzed with the respective machine learning model to obtain a prediction result. Machine learning enricher 202 may receive results back from the one or more machine learning modes 203 and aggregate the results to the event, creating an "enriched" event, i.e. an event with context, similar to the scatter-gather approach as discussed earlier. In some embodiments, the communications between machine learning enricher 202 and machine learning models 203 may operate via HTTP or HTTPS protocol. Machine learning enricher 202 may then send the enriched event to rule engine 204. Rule engine 204 may determine if an alert for the event is warranted based on a pre-defined set of rules.

As an example, machine learning enricher 202 may receive a tweet from network ingest service 201 based on a mention of a specific company, company A. The tweet may include an angry complaint about Company A and some curses in a foreign language (e.g. German). The unenriched event (or data packet) is simply a tweet, or collection of text in a JSON format. Rule engine 204 may have difficulty in deciding whether the unenriched event, once received from machine learning enricher 202, warrants an alert. However, machine learning enricher 202 may use the machine learning models 203 to enrich the tweet and provide context. Machine learning enricher 202 may send the event to Model A 203a, a sentiment analysis model, send the event to Model B 203b, a language detection model, and send the event to Model N 203n, a money flipping analysis model. It may be sent in parallel, i.e. to all models at the same time. Model A may predict that the tweet has an angry sentiment, and return an "angry" result as a JSON to machine learning enricher 202. Model B may predict that the tweet has "German" in it, and return a "German" result as a JSON to machine learning enricher 202. Model N may predict that there is no money-flipping scam present, and return a "negative" result to machine learning enricher 202. Machine learning enricher 202 may then aggregate the received results, i.e. decide to add certain results to the event. Machine learning enricher 202 may add the "angry" result and the "German" result to the event but not the "negative" money-flipping presence result. Machine learning enricher may then forward the enriched event to rule engine 204. If Company A currently knows of an issue that is happening with a product in their German markets and employs a rule to be alerted to related events, rule engine 204 may determine that this tweet warrants an alert, and a notification may alert the company.

Figure 3:
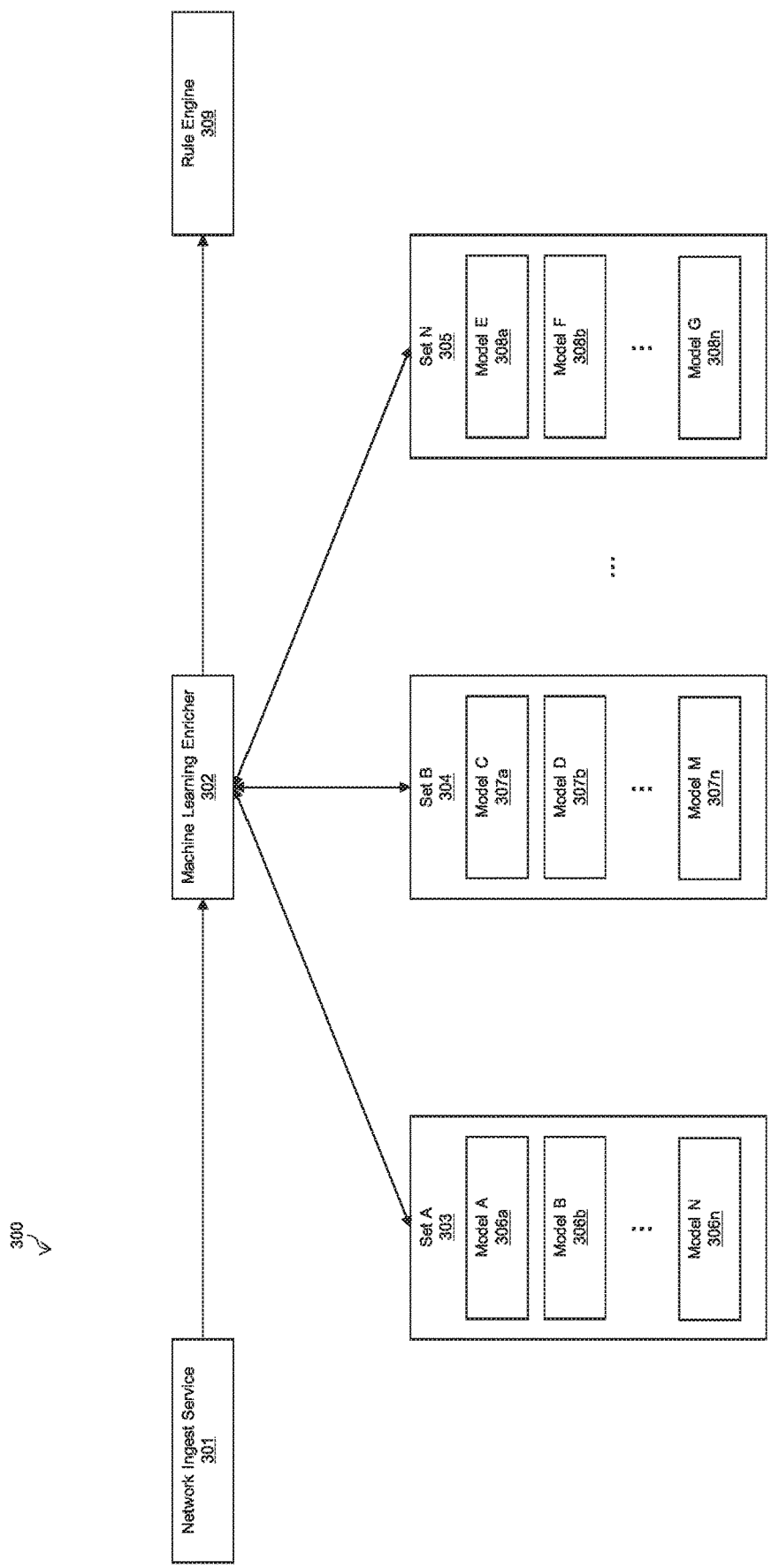
FIG. 3 is another block diagram describing the flow of information within an enrichment system, according to some embodiments of the present disclosure.

FIG. 3 is another block diagram describing the flow of information within an enrichment system 300, according to some embodiments of the present disclosure. System 300 may operate similarly to system 200, in that it may include a network ingest service 301 connected to the same data sources; a machine learning enricher 302 that may send events to machine learning models, obtain results from those models, and aggregate those results to enrich the event; and a rule engine 309 that may receive enriched events from machine learning enricher 302. However, in some embodiments, system 300 may employ a multi-stage scatter-gather framework. Machine learning enricher 302 may receive an event, send the event to one or more machine learning models (i.e. sets 303-305 of machine learning models), receive and aggregate the results to create an enriched event, and then perform another enrichment of the already enriched event. After enriching the event with results from a set of models, machine learning enricher 302 may determine a subsequent set of machine learning models to send the enriched event to for further analysis. Machine learning enricher 302 may then receive another set of results (i.e. predictions about the enriched event), and aggregate those results to further enrich the event. There may be any number of enrichment iterations/stages, e.g. four or more iterations/stages. At each iteration, machine learning enricher 302 may determine which models or sets of models 303-305 to send the event to based on the data source or the results of the previous stage. In other words, after each stage of enrichment, machine learning enricher 302 may separately evaluate and decide where to send the event to for further enrichment.

For example, machine learning enricher 302 may receive an event that is a Facebook picture post (i.e. a post that contains an image) from network ingest service 301. This may be ingested by the network ingest service 301 based on a geographic proximity to a school. At stage 1, machine learning enricher 302 may send the event to Set A 303, which may include Model A 306a, an analysis message mapper model. Model A 306a may extract important fields scattered throughout the event, map them to a structured format, and determine the presence of images. Machine learning enricher 302 may receive the structured format and the "has images" result from Model A 306a and may add this result to the event to create an enriched event. At stage 2, machine learning enricher 302 may then determine, based on the enrichment, which sets of models to send the enriched event to. Since the event has been determined to have an image, machine learning enricher 302 may then decide to send the enriched event to Set B 304, which includes Model C 307a (OCR analysis model to extract text) and Model D 307b (object detection model to detect certain objects, e.g. guns). Model C 307a's prediction result may include the extracted text and Model D 307b's prediction result may include a "positive" or "negative" result on if an object has been detected. Machine learning enricher 302 may then receive the prediction results from both Model C 307a and Model D 307b and add the results to the enriched event to create a second enriched event.

At stage 3, machine learning enricher 302 may make another determination, based on the previous round or rounds of enrichment, on which set of models to send the second enriched event to. For example, if the OCR analysis model (Model C 307a) extracts text in stage 2, at stage 3, machine learning enricher 302 may send the event enriched with the extracted text to Set N, which includes Model E 308a (sentiment analysis model) and Model F 308b (money-flipping analysis model). If the OCR analysis model (Model C 307a) had not found and extracted any text in stage 2, machine learning enricher 302 may have elected to send the event elsewhere. It is important to note that any number of stages may be utilized, depending on the extent of enrichment desired. When a certain level of enrichment is provided or a certain number of stages have been completed, the enriched event is sent from machine learning enricher 302 to the rule engine 309, where an alert may or may not be sent. Also note that not only does a framework such as this improve the context that is provided to each event, it also may reduce the computational load by intelligently preventing each received event from being analyzed by every possible machine learning model.

Figure 4:
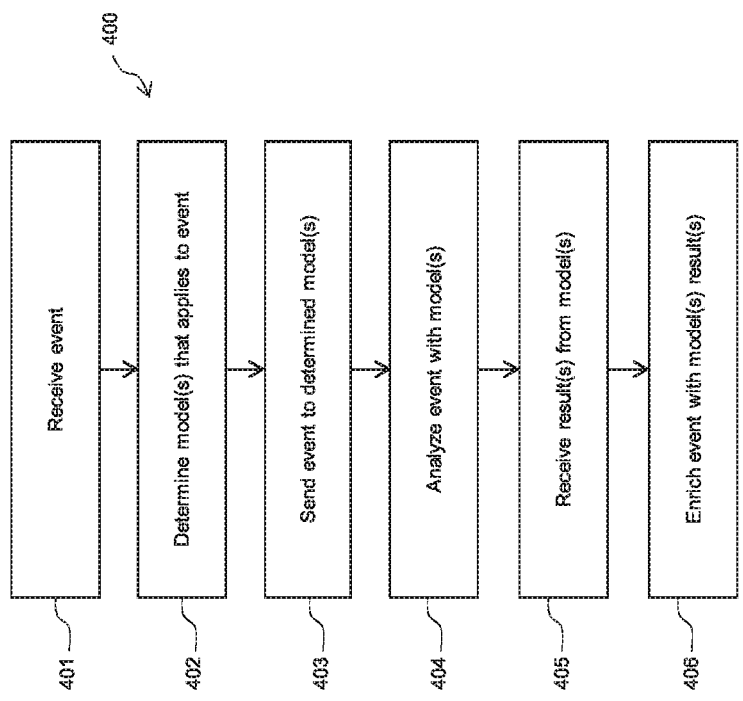
FIG. 4 is a flow diagram showing processing that may occur within the enrichment system, according to some embodiments of the present disclosure.

FIG. 4 is a flow diagram showing process 400 that may occur within the enrichment system, according to some embodiments of the present disclosure. At block 401, machine learning enricher 202 receives an event from network ingest service 201. As described in relation to FIGS. 1-2, network ingest service 201 may monitor various social network platforms, email accounts, and/or domains and extract "events" (e.g. posts, tweets, videos, emails, domains) from these data sources. In some embodiments, a queuing service may be employed to continuously deliver events. Events may be ingested based on a variety of criteria, such as geographic location, keyword mentions, authored by employees of a company, emails incoming to specific accounts, domains similar to a certain website, and the like. For example, if Company A recently released a new product called "Product A", machine learning enricher 202 may receive all social media posts that mention "Product A". In another example, machine learning enricher 202 may receive all social media posts within a five mile radius of a school. In another example, machine learning enricher 202 may receive all incoming emails of all employees of a company. In some embodiments, machine learning enricher 202 may receive the event in the form of a JSON object.

At block 402, machine learning enricher 202 determines at least one model of a plurality of models that applies to the received event. In some embodiments, machine learning enricher 202 may make this determination based on the source of the event. For example, if an event is received from an email data source, machine learning enricher 202 may send the event to an email analysis model. In some embodiments, machine learning enricher 202 may make this determination based on the content of the event. For example, if the event has an image, machine learning enricher 202 may elect an OCR analysis model. On the other hand, if the event does not have an image, machine learning enricher 202 may elect other models. In another example, if the event has text, machine learning enricher 202 may elect a sentiment analysis model, money-flipping analysis model, or other model that is trained to make predictions based on text only.

At block 403, machine learning enricher 202 sends the event to the determined models 203a-n. In some embodiments, machine learning enricher 202 may send the events to multiple models in parallel. In some embodiments, machine learning enricher 202 may send the event to the models using an HTTP or HTTPS protocol. In some embodiments, the event may be sent in a JSON format. At block 404, the machine learning model or models that received the event analyze the event to make a prediction result. In some embodiments, a prediction result may be output in a JSON format. In some embodiments, a prediction result may be a binary result (i.e. positive/negative, yes/no, etc.). In some embodiments, a prediction result may be a number or a decimal corresponding to a confidence score or confidence level. In some embodiments, a prediction result may be text. At block 405, machine learning enricher 202 receives the prediction results from the machine learning model or models that performed analysis on the event. At block 406, machine learning enricher 202 enriches the event with the received results from the models. In some embodiments, this may entail adding the prediction result JSON onto the event JSON. In some embodiments, machine learning enricher 202 may aggregate multiple received results. In some embodiments, multiple results may be added. In some embodiments, some prediction results may not be added. After the completion of process 400, machine learning enricher 202 may forward the enriched event to a rule engine that may determine if the event warrants an alert.

Figure 5:
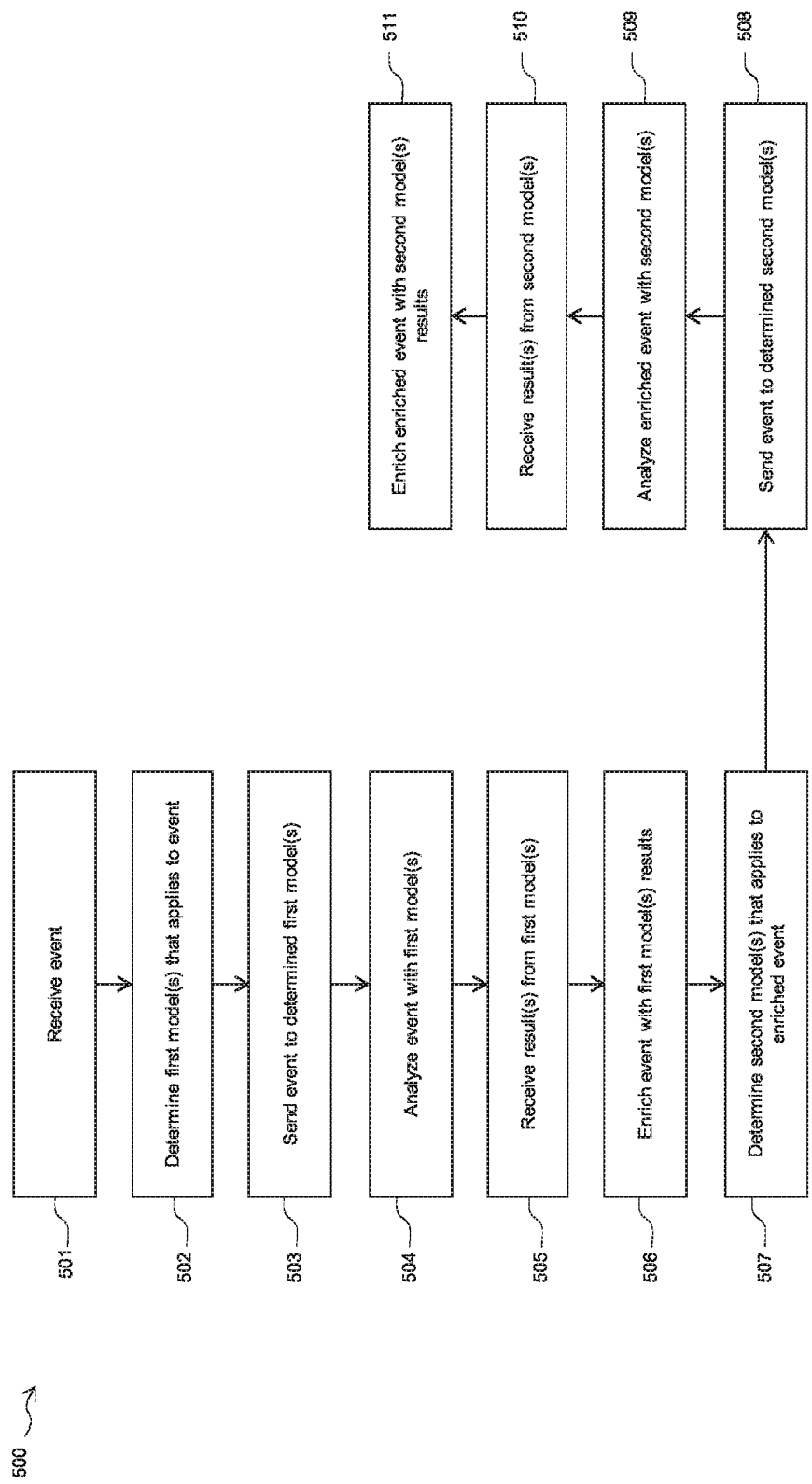
FIG. 5 is another flow diagram showing processing that may occur within the enrichment system, according to some embodiments of the present disclosure.

FIG. 5 is another flow diagram showing process 500 that may occur within the enrichment system, according to some embodiments of the present disclosure. At block 501, machine learning enricher 302 receives an event from network ingest service 301. As described in relation to FIGS. 1 and 3, network ingest service 301 may monitor various social network platforms, email accounts, and/or domains and extract "events" (e.g. posts, tweets, videos, emails, domains) from these data sources. In some embodiments, a queuing service may be employed to continuously deliver events. Events may be ingested based on a variety of criteria, such as geographic location, keyword mentions, authored by employees of a company, emails incoming to specific accounts, domains similar to a certain website, and the like. For example, if Company A recently released a new product called "Product A", machine learning enricher 302 may receive all social media posts that mention "Product A". In another example, machine learning enricher 302 may receive all social media posts within a five mile radius of a school. In another example, machine learning enricher 302 may receive all incoming emails of all employees of a company. In some embodiments, machine learning enricher 302 may receive the event in the form of a JSON object.

At block 502, machine learning enricher 302 determines at least one model of a plurality of models, or one set of a plurality of sets of models, where each set contains at least one machine learning model, that applies to the received event. In some embodiments, machine learning enricher 302 may make this determination based on the source of the event. For example, if an event is received from an email data source, machine learning enricher 302 may send the event to an email analysis model. In some embodiments, machine learning enricher 302 may make this determination based on the content of the event. For example, if the event has an image, machine learning enricher 302 may elect an OCR analysis model. On the other hand, if the event does not have an image, machine learning enricher 302 may elect other models. In another example, if the event has text, machine learning enricher 302 may elect a sentiment analysis model, money-flipping analysis model, or other model that is trained to make predictions based on text only.

At block 503, machine learning enricher 302 sends the event to the determined models or sets of models 303-305. In some embodiments, machine learning enricher 302 may send the events to multiple models in parallel. In some embodiments, the models may be within a set or may not be within a set. In some embodiments, there may be no "sets", only a large plurality of models, and the machine learning enricher 302 elects one or more models. In some embodiments, machine learning enricher 302 may send the event to the models using an HTTP or HTTPS protocol. In some embodiments, the event may be sent in a JSON format. At block 504, the machine learning model or models that received the event analyze the event to make a prediction result. In some embodiments, a prediction result may be output in a JSON format. In some embodiments, a prediction result may be a binary result (i.e. positive/negative, yes/no, etc.). In some embodiments, a prediction result may be a number or a decimal. In some embodiments, a prediction result may be text. At block 505, machine learning enricher 302 receives the prediction results from the machine learning model or models that performed analysis on the event. At block 506, machine learning enricher 302 enriches the event with the received results from the models. In some embodiments, this may entail adding the prediction result JSON onto the event JSON. In some embodiments, machine learning enricher 302 may aggregate multiple received results. In some embodiments, multiple results may be added. In some embodiments, some prediction results may not be added.

At block 507, machine learning enricher 302 determines a second set of models that applies to the enriched event. In some embodiments, machine learning enricher 302 may make this determination based on the content of the original event or the results of the first iteration of enrichment. As described in an example in relation to FIG. 3, if the first round of enrichment determines that the event has an image, machine learning enricher may elect to send the enriched event to an OCR analysis model to extract text from the image. In another example, if a round of enrichment determines an event has an image, and a subsequent round of enrichment extracts text from the image, machine learning enricher may elect to send the event to multiple models that analyze text, such as a sentiment analysis model, a money-flipping analysis model, or language detection model. If the image is determined to not have any text, machine learning enricher 302 may elect to send the event elsewhere for enrichment. At block 508, machine learning enricher 302 sends the enriched event to the determined second models for enrichment. Similar to block 504, the models analyze the enriched event to make predictions on the event. At block 510, machine learning enricher 302 receives the results from the second models. At block 511, machine learning enricher 302 enriches the enriched event with the prediction results received form the machine learning models. After the completion of process 500, machine learning enricher 302 may forward the enriched event to a rule engine that may determine if the event warrants an alert.

Note that process 500 includes two iterations or stages of enrichment. This is not exhaustive and any number of iterations of enrichment may be performed, according to some embodiments of the present disclosure. In some embodiments, 4 or more iterations or stages may be performed.

Figure 6:
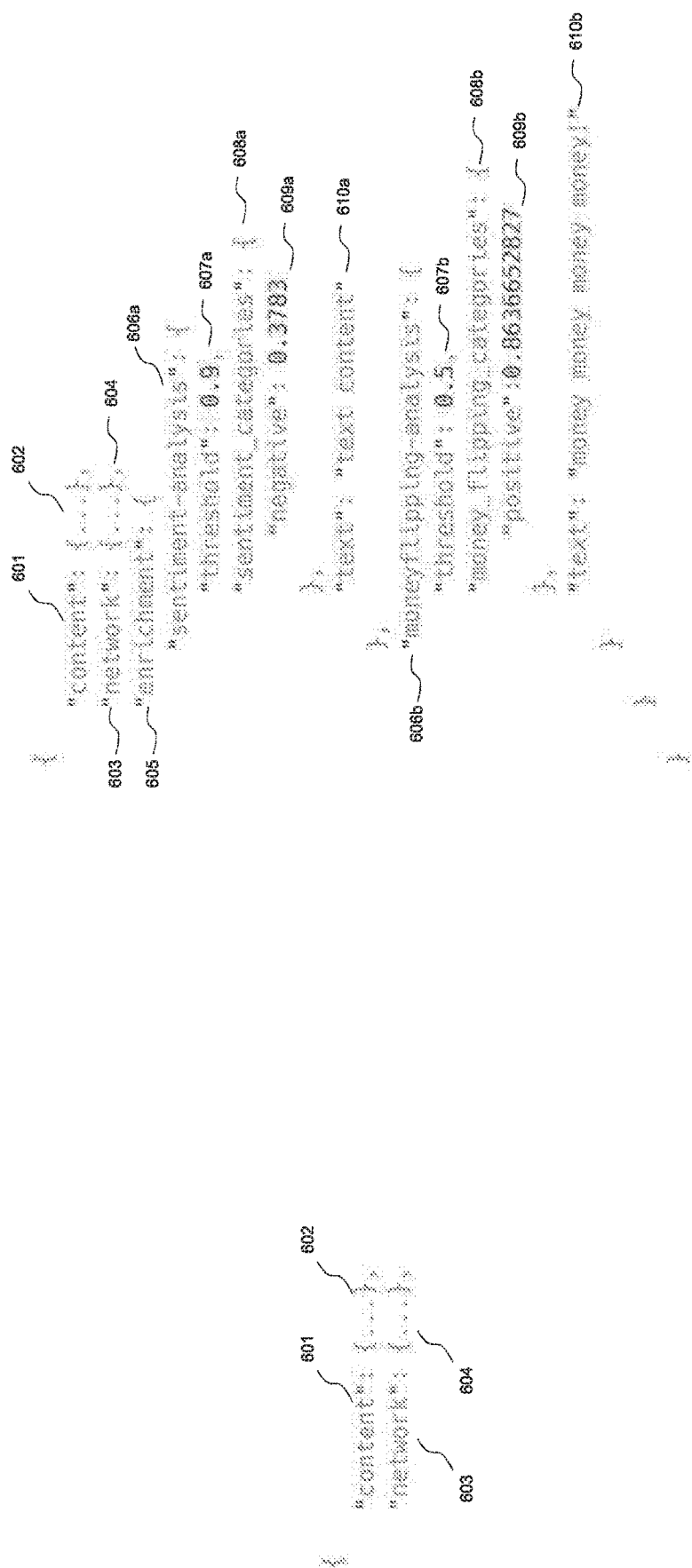
FIGS. 6A and 6B are examples of both an unenriched and enriched data packet, according to some embodiments of the present disclosure.

FIGS. 6A and 6B are examples of both an unenriched and enriched data packet, according to some embodiments of the present disclosure. FIG. 6A is an example format for an event (JSON format). In this format, only the content 602 of the event (demarcated by the content field label 601) and network type 604 (demarcated by the network field label 603) is included. For example, content may be text from an email, tweet, or Facebook post. The network may be the network or data source where the content originated from (e.g. email, Instagram network, Twitter network, etc.). FIG. 6B is an example of an enriched event, also in JSON format. The format, once again, includes the content 602 (demarcated by content field label 601) and the network type 604 (demarcated by network field label 603) where the event originated from. The enrichment section 605 includes results from a sentiment analysis model (demarcated by model field label 606a), such as a threshold 607a, detected sentiment categories 608a, a weight factor 609a of the detected categories, and text content 610a from the original event. The enrichment section 605 also includes results from a money-flipping analysis model (demarcated by model field label 606b), such as a threshold 607b, detected money flipping categories 608b, a weight factor 609b of the detected categories, and text content 610b from the original event.

Figure 7:
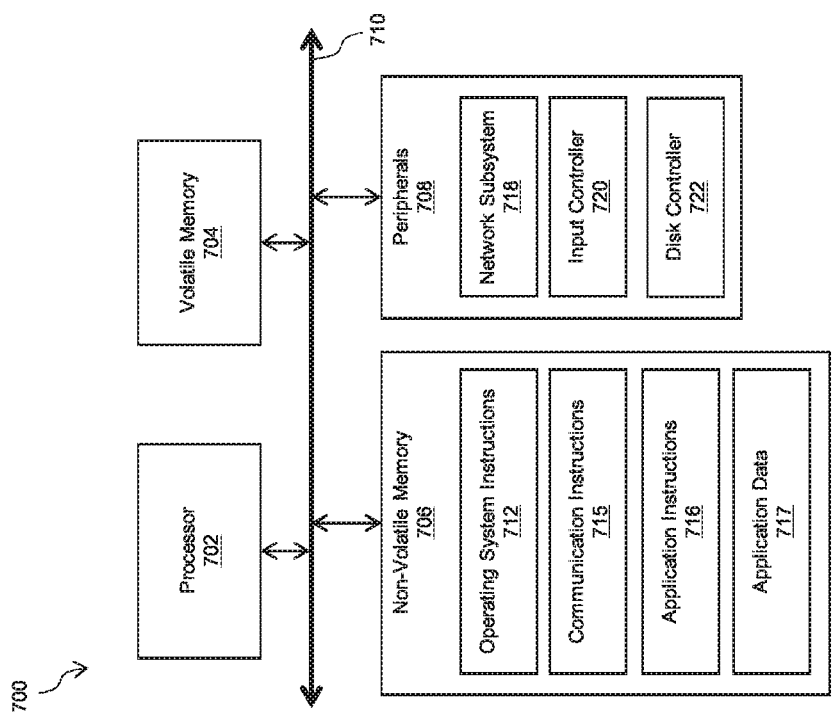
FIG. 7 is an example processing device, according to some embodiments of the present disclosure.

FIG. 7 is a diagram of an illustrative server device 700 that can be used within systems of FIGS. 1-3, according to some embodiments of the present disclosure. In some embodiments, server device 700 may be a virtual server device, such as an Elastic Compute Cloud (EC2) instance of spot instance within Amazon Web Services. Server device 700 may implement various features and processes as described herein. Server device 700 may be implemented on any electronic device that runs software applications derived from complied instructions, including without limitation personal computers, servers, smart phones, media players, electronic tablets, game consoles, email devices, etc. In some implementations, server device 700 may include one or more processors 702, volatile memory 704, non-volatile memory 706, and one or more peripherals 708. These components may be interconnected by one or more computer buses 710.

Processor(s) 702 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 710 may be any known internal or external bus technology, including but not limited to ISA, EISA, PCI, PCI Express, NuBus, USB, Serial ATA, or FireWire. Volatile memory 704 may include, for example, SDRAM. Processor 702 may receive instructions and data from a read-only memory or a random access memory or both. The essential elements of a computer may include a processor for executing instructions and one or more memories for storing instructions and data.

Non-volatile memory 706 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 706 may store various computer instructions including operating system instructions 712, communication instructions 714, application instructions 716, and application data 717. Operating system instructions 712 may include instructions for implementing an operating system (e.g., Mac OS®, Windows®, or Linux). The operating system may be multi-user, multiprocessing, multitasking, multithreading, real-time, and the like. Communication instructions 714 may include network communications instructions, for example, software for implementing communication protocols, such as TCP/IP, HTTP, Ethernet, telephony, etc. Application instructions 716 can include instructions for enriching data, providing context to data, and ultimately improving the process of distributing alerts for detected online events according to the systems and methods disclosed herein. For example, application instructions 716 may include instructions for components within FIGS. 1-3.

Peripherals 708 may be included within server device 700 or operatively coupled to communicate with server device 700. Peripherals 708 may include, for example, network subsystem 718, input controller 720, and disk controller 722. Network subsystem 718 may include, for example, an Ethernet of WiFi adapter. Input controller 720 may be any known input device technology, including but not limited to a keyboard (including a virtual keyboard), mouse, track ball, and touch-sensitive pad or display. Disk controller 722 may include one or more mass storage devices for storing data files; such devices include magnetic disks, such as internal hard disks and removable disks; magneto-optical disks; and optical disks.

Figure 8:
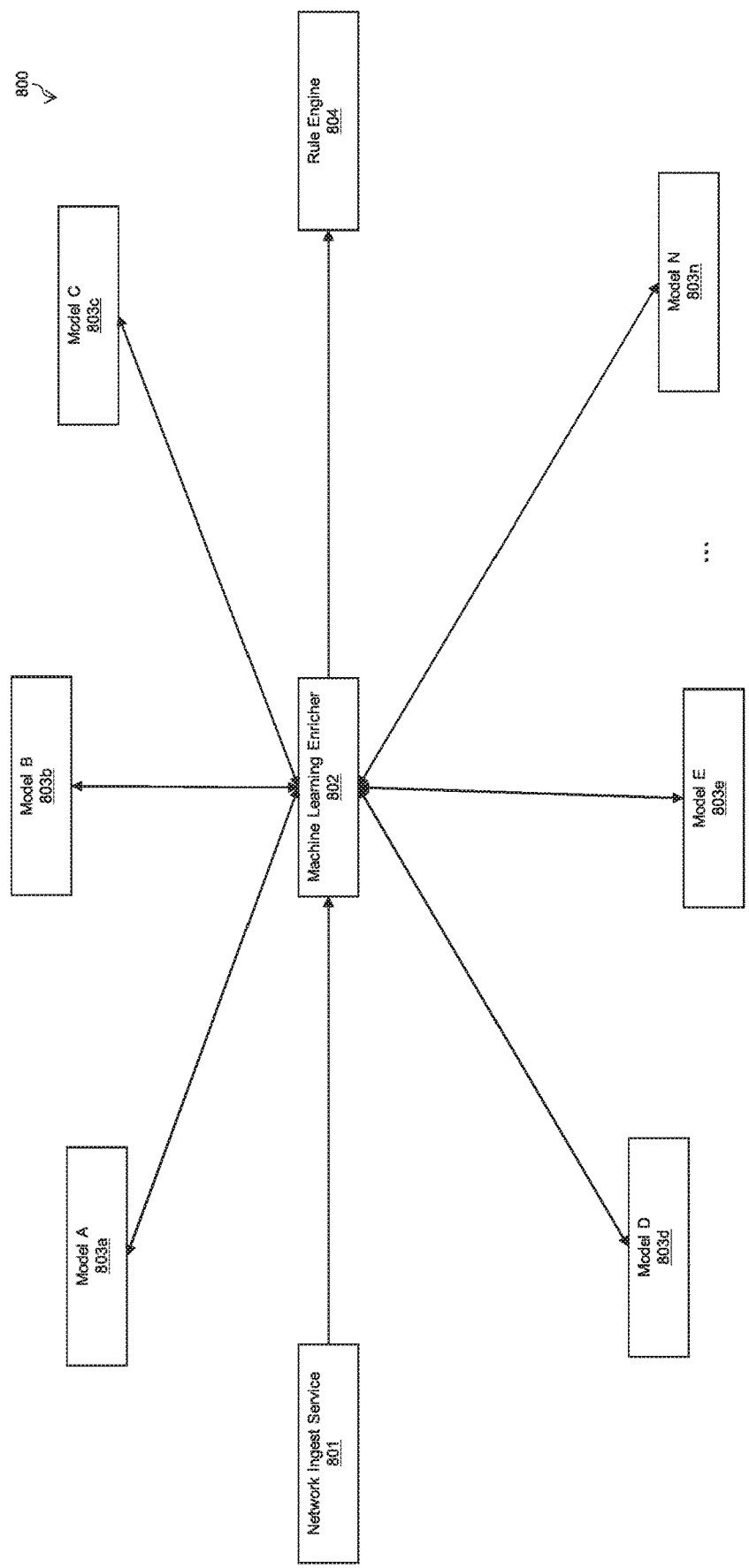
FIG. 8 is an alternate block diagram describing the flow of information within an enrichment system, according to some embodiments of the present disclosure.

FIG. 8 is an alternate block diagram describing the flow 800 of information within an enrichment system, according to some embodiments of the present disclosure. The system 800 may operate in much the same fashion as system 300 within the context of FIG. 3. A network ingest service 801 ingests events from a plurality of data sources. In some embodiments, a queuing service may be employed to continuously provide events. A machine learning enricher 802 receives events from network ingest service 801. The process of enrichment in system 800 is the same as the process of enrichment within system 300 of FIG. 3, except models may not be confined to pre-defined sets. In some embodiments, a plurality of models 803a-n may exist independently and machine learning enricher 802 may decide from all possible models at each stage of enrichment. In some embodiments, models A-N may operate as a spot instance within Amazon Web Services (AWS). In some embodiments, machine learning enricher 802 may also operate as a spot instance within AWS.

Methods described herein may represent processing that occurs within a system for enriching data (e.g., process 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A computer-implemented method for enriching data comprising:
   receiving, via a server, a data packet from a source of a plurality of sources;
   determining, via the server, a first set of at least one machine learning model that applies to the data packet;
   in response to determining the first set, sending, via the server, the data packet to the first set;
   analyzing the data packet with the first set to obtain a first collection of results;
   receiving, via the server, the first collection of results from the first set;
   adding, via the server, at least a portion of the first collection of results to the data packet to create a first enriched data packet;
   determining, via the server, a second set of at least one machine learning model that applies to the first enriched data packet;
   in response to determining the second set, sending, via the server, the enriched data packet to the second set;
   analyzing the first enriched data packet with the second set to obtain a second collection of results;
   receiving, by the server, the second collection of results from the second set;
   adding, via the server, at least a portion of the second collection of results to the first enriched data packet to create a second enriched data packet.

2. The computer-implemented method of claim 1, wherein a result comprises at least one of a binary prediction, a number representing a confidence level of a prediction, or text.

3. The computer-implemented method of claim 2 comprising parsing the data packet to extract fields required for the determined sets.

4. The computer-implemented method of claim 1, wherein determining the first set is based on at least one attribute of the data packet, wherein attributes comprise text inclusion, image inclusion, URL inclusion, type of language, and type of message.

5. The computer-implemented method of claim 1, wherein determining the second set is based on at least a portion of the first collection of results.

6. The computer-implemented method of claim 1, wherein an enriched data packet is a JSON object comprising a data packet and a corresponding result.

7. The computer-implemented method of claim 1 comprising sending the second enriched data packet to a notification service.

8. The computer-implemented method of claim 1, wherein the data packet is received from a queueing service.

9. The computer-implemented method of claim 1, wherein sending the data packet comprises employing an HTTP or an HTTPS protocol to transmit the data packet to the first set.

10. The computer-implemented method of claim 1, wherein sending the first enriched data packet comprises employing an HTTP or an HTTPS protocol to transmit the first enriched data packet to the second set.

11. A system for enriching data comprising:
    a network connected to at least one data source;
    a data ingestion service configured to ingest data packets via the network from the at least one data source;

an enrichment service configured to, by at least one processor:
   receive ingested data packets from the data ingestion service;
   determine at least one machine learning model of a plurality of machine learning models that applies to the data packet;
   send the data packet, in the form of a JSON, to the at least one machine learning model;
   receive a result, in the form of a JSON, from the at least one machine learning model, wherein the result comprises at least one of a binary prediction result, a number representing a confidence level of a prediction, or text;
   add the result to the data packet to create an enriched data packet; and
   compile the enriched data packet as a JSON object; and
at least one machine learning model configured to, by at least one processor:
   receive the data packet;
   analyze the data packet to obtain the result; and
   send the result to the enrichment service.

12. The system of claim 11, wherein the enrichment service is configured to:
   employ an HTTP or an HTTPS protocol to transmit the data packet to the at least one machine learning model.

13. The system of claim 11 comprising a notification service configured to:
   receive the enriched data packet from the enrichment service; and
   distribute a notification containing the data packet based on a set of rules.

14. A computing system for enriching data comprising:
one or more processors; and
one or more non-transitory computer-readable media storing a first and second set of at least one machine learning model and instructions that, when executed by the one or more processors, cause the computing system to perform operations comprising:
   receiving a data packet from a source of a plurality of sources;
   determining that the first set applies to the data packet;
   in response to determining the first set, providing the data packet as an input to the first set;
   analyzing the data packet with the first set to obtain a first collection of results;
   adding at least a portion of the first collection of results to the data packet to create a first enriched data packet;
   determining that the second set applies to the first enriched data packet;
   in response to the second determining the second set, providing the first enriched data packet as an input to the second set;
   analyzing the first enriched data packet with the second set to obtain a second collection of results; and
   adding at least a portion of the second collection of results to the first enriched data packet to create a second enriched data packet.

15. The computing system of claim 14, wherein a result comprises at least one of a binary prediction, a number representing a confidence level of a prediction, or text.

16. The computing system of claim 15 comprising parsing the data packet to extract fields required for the determined sets.

17. The computing system of claim 14, wherein determining the first set is based on at least one attribute of the data packet, wherein attributes comprise text inclusion, image inclusion, URL inclusion, type of language, and type of message.

18. The computing system of claim 14, wherein determining the second set is based on at least a portion of the first collection of results.

19. The computing system of claim 14 comprising sending the second enriched data packet to a notification service.

20. The computing system of claim 14, wherein the data packet is received from a queueing service.

* * * * *